United States Patent
Huda et al.

(10) Patent No.: US 9,242,415 B2
(45) Date of Patent: Jan. 26, 2016

(54) TRANSPARENT AND REUSABLE VACUUM INFUSION HEATING BAG AND METHODS OF MAKING AND USING SAME

(75) Inventors: Mohammad Irfan Huda, Nanuet, NY (US); Bernle Fu, Stamford, CT (US)

(73) Assignee: BASF CORPORATION, Florham Park, NJ (US)

( * ) Notice: Subject to any disclaimer, the term of this patent is extended or adjusted under 35 U.S.C. 154(b) by 545 days.

(21) Appl. No.: 13/543,392

(22) Filed: Jul. 6, 2012

(65) Prior Publication Data

US 2014/0008845 A1    Jan. 9, 2014

(51) Int. Cl.
*B29C 70/36* (2006.01)
*B29C 70/44* (2006.01)
*B29C 33/02* (2006.01)
*B29C 35/02* (2006.01)
B29C 43/36 (2006.01)
B29C 43/12 (2006.01)

(52) U.S. Cl.
CPC ........... *B29C 70/443* (2013.01); *B29C 33/02* (2013.01); *B29C 35/02* (2013.01); *B29C 43/12* (2013.01); *B29C 70/44* (2013.01); *B29C 2035/0211* (2013.01); *B29C 2043/3644* (2013.01)

(58) Field of Classification Search
CPC ...... B29C 70/44; B29C 70/443; B29C 43/12; B29C 2043/3644; B29C 33/02; B29C 35/02; B29C 2035/0211
USPC .................. 425/504, 508, 388, 389, 403, 384
See application file for complete search history.

(56) References Cited

U.S. PATENT DOCUMENTS

| | | | |
|---|---|---|---|
| 4,948,826 A | 8/1990 | Hirai | |
| 5,002,476 A * | 3/1991 | Kerr | 425/174.4 |
| 5,104,591 A * | 4/1992 | Masuhara et al. | 264/16 |
| 5,705,258 A | 1/1998 | Okami et al. | |
| 5,829,171 A * | 11/1998 | Weber et al. | 36/93 |
| 6,031,212 A * | 2/2000 | Westerman et al. | 219/535 |
| 7,029,267 B2 * | 4/2006 | Caron | 425/389 |
| 7,592,070 B2 | 9/2009 | Takanami et al. | |
| 7,686,915 B1 * | 3/2010 | McAnally | 156/286 |
| 8,128,396 B2 | 3/2012 | Ross et al. | |

(Continued)

FOREIGN PATENT DOCUMENTS

| | | | |
|---|---|---|---|
| GB | 2322823 A | 9/1998 | |
| JP | 56054077 A * | 5/1981 | H01L 31/02 |

(Continued)

OTHER PUBLICATIONS

English language abstract and translation extracted for WO 2012062235 extracted from espacenet.com on Oct. 18, 2013, 24 pages.

(Continued)

*Primary Examiner* — Seyed Masoud Malekzadeh
(74) *Attorney, Agent, or Firm* — Howard & Howard Attorneys PLLC

(57) ABSTRACT

The presently disclosed and claimed inventive concept(s) relates to a transparent and reusable vacuum infusion heating bag for heating one or more curable materials against a tool, dispersing a permeating substance through the curable material and forming composite parts. The transparent and reusable vacuum infusion heating bag comprises a substantially transparent laminate containing a heating element. The heating element is sandwiched between a first layer and a second layer of flexible polymer material.

13 Claims, 2 Drawing Sheets

(56) References Cited

U.S. PATENT DOCUMENTS

| | | | |
|---|---|---|---|
| 8,196,452 B2 * | 6/2012 | Nelson et al. | 73/37 |
| 8,388,795 B2 * | 3/2013 | Tsotsis | 156/276 |
| 8,438,909 B2 * | 5/2013 | Miller et al. | 73/49.3 |
| 8,628,639 B2 * | 1/2014 | Thompson et al. | 156/285 |
| 8,833,144 B2 * | 9/2014 | Nelson et al. | 73/37 |
| 2002/0050321 A1 * | 5/2002 | Tone et al. | 156/306.6 |
| 2005/0086916 A1 | 4/2005 | Caron | |
| 2008/0182059 A1 * | 7/2008 | Kakuta et al. | 428/64.8 |
| 2009/0275257 A1 * | 11/2009 | Sun et al. | 445/50 |
| 2010/0170326 A1 * | 7/2010 | Miller et al. | 73/49.3 |
| 2010/0289183 A1 * | 11/2010 | Tsushima et al. | 264/293 |
| 2011/0164987 A1 * | 7/2011 | Grabau | 416/230 |

FOREIGN PATENT DOCUMENTS

| | | |
|---|---|---|
| WO | WO 00/71329 A1 | 11/2000 |
| WO | WO 2012062235 A1 | 5/2012 |

OTHER PUBLICATIONS

International Search Report for Application No. PCT/US2013/049042 dated Oct. 8, 2013, 6 pages.

* cited by examiner

TRANSPARENT AND REUSABLE VACUUM INFUSION HEATING BAG AND METHODS OF MAKING AND USING SAME

BACKGROUND OF THE INVENTION

1. Field of the Presently Disclosed and Claimed Inventive Concepts

The presently disclosed and claimed inventive concept(s) relates generally to a transparent and reusable vacuum infusion heating bag with a heating element for forming polymeric materials. More particularly, the presently disclosed and claimed inventive concept(s) relates to a transparent and reusable vacuum infusion heating bag or a laminate layer with a heating element in resin transfer molding and bagging operation. The presently disclosed and claimed inventive concept(s) further relates to methods of making the vacuum infusion heating bag and using the vacuum infusion heating bag for making composite parts.

2. Background and Applicable Aspects of the Presently Disclosed and Claimed Inventive Concept(s)

Vacuum assisted resin transfer molding (VARTM) is a composite part manufacturing process in which dry fibers of composite material are laid on a forming tool beneath a vacuum bag and vacuum sealed while liquid resin is drawn through the composite material with a vacuum pump. Traditionally, a flow media or resin distribution media made of nylon, plastic, or metal and having a high permeability is placed over the composite material to allow resin to flow over it and subsequently be evenly dispersed throughout the composite material. Additionally, a breather cloth made of fiberglass or peel-ply may be placed beneath the vacuum bag to help pull resin through the material and allow air to be evacuated from between the vacuum bag and the tool. The vacuum bag may then be placed over the composite material, flow media, and breather cloth, and sealed to the forming tool with a vacuum sealing apparatus. A vacuum inlet and a vacuum outlet may allow the liquid resin to be pulled through the composite material. Once the liquid resin is distributed throughout the composite material and the vacuum bag is compressed against the composite material by vacuum force, the vacuum pump may be removed, and the part may then be cured at ambient or by heat to harden the composite part. The vacuum bag is then removed from the forming tool so that the composite part may be separated from the tool.

Because the construction of vacuum bags is time-consuming and expensive, it is desirable that the vacuum bag be reusable. A common vacuum bag material is nylon. For fabricating a composite part on a forming tool having small inside and outside radii, nylon vacuum bags are desirable as the thin nylon film can be laid over the composite part on the forming tool. The nylon film can then be hand conformed to the small inside radii of the forming tool. However, nylon loses considerable resiliency after a single use in an autoclave and therefore cannot be reused to fabricate another composite part. Furthermore, composite parts fabricated using nylon vacuum bags may exhibit flaws in that wrinkles and pinholes may appear due to the bunching up of the nylon film against the forming tool under vacuum pressure. Leakage of the seal between the vacuum bag and the forming tool has also limited production of composite from nylon vacuum bags.

As an alternative, silicone rubber has been utilized to fabricate vacuum bags because it has an elongation of over 500% which allows it to be stretched over small radii on a forming tool. Furthermore, silicone rubber has a maximum exposure temperature of 260° C. which allows for greater curing cycle flexibility. Finally, as compared to nylon, silicone rubber retains its resiliency over many curing cycles and is therefore suitable as a reusable vacuum bag material.

Generally, a transparent or translucent vacuum bag is preferred to allow easy inspection of composite materials to be cured. Much improved visual quality control can be achieved because the resin flow front line can be seen through the transparent or translucent vacuum bag, as well as its penetration through the composite materials.

Some resins have to be cured above room temperature, for example but not by way of limitation, an epoxy resin is cured usually around 60 to 65° C. depending on the process. In order to cure a resin composite part above room temperature, the part has to be heated at a certain temperature. Currently, heat is supplied from a tool side (it is usually called A side on which a part is being laid). The tool side has a built-in heating element. However, the heat is not uniform on the top surface of the part because heat is only provided from the bottom and in some cases a core material in the complex composite part prevents heat to be transferred from the bottom to the top surface (basically the core material acts like insulation). So in those cases, a source of heat from top (it is called B side heating) has to be provided.

Normally, a "heating blower" is used to blow heat in a plastic sealed covered tool. The plastic keeps all the hot air coming out of the blower around the tool area by creating an air bubble or balloon on top of the tool. So this type of heating uses convection to heat the B side. Convection heating is very inefficient compared to conduction heating for heat transfer. Most of heat are lost and cannot be transferred to the B side. As a result, it takes a long time to reach the cure temperature of resin.

DETAILED DESCRIPTION

Figure 1:
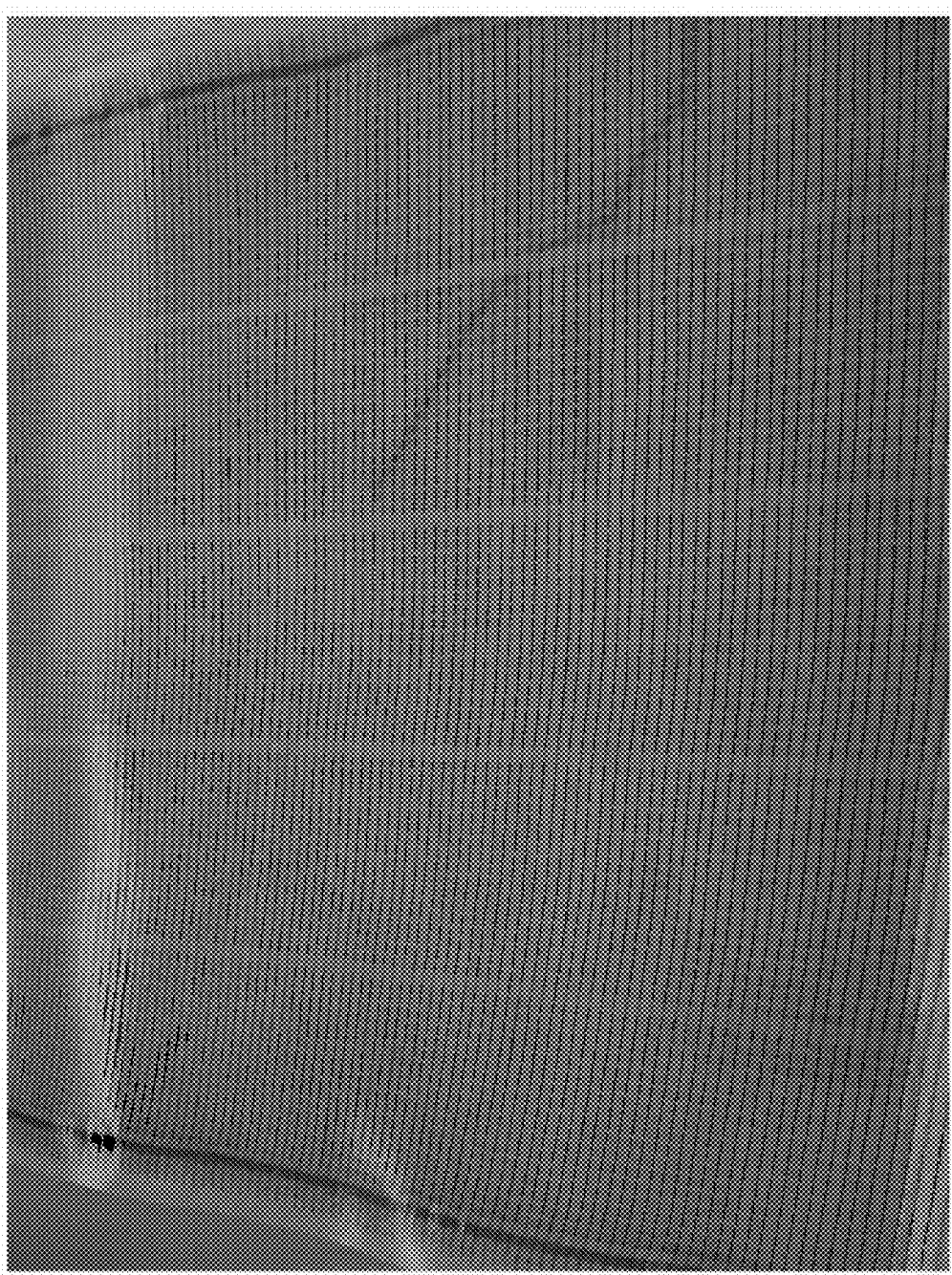
FIG. 1 is a photograph of a substantially transparent and reusable vacuum infusion heating bag in accordance with one embodiment of the presently disclosed and claimed inventive concept(s).

Before explaining at least one embodiment of the presently disclosed and claimed inventive concept(s) in detail, it is to be understood that the presently disclosed and claimed inventive concept(s) is not limited in its application to the details of construction, experiments, exemplary data, and/or the arrangement of the components set forth in the following description or illustrated in the drawings. The presently disclosed and claimed inventive concept(s) is capable of other embodiments or of being practiced or carried out in various ways. Also, it is to be understood that the phraseology and terminology employed herein is for purpose of description and should not be regarded as limiting.

Disclosed herein is a substantially transparent and reusable vacuum infusion heating bag with a heating element. The vacuum infusion heating bag can be used to heat one or more curable material on a tool, disperse a permeating substance through the curable material, and cure the permeating substance to form a composite part at elevated temperatures with less curing time than a traditional vacuum bag. The substantially transparent and reusable vacuum infusion heating bag comprises a layer of substantially transparent laminate containing a heating element. The heating element is sandwiched between a first layer and a second layer of flexible polymer material. A first side of the laminate is configured to face away from the curable material while a second side of the laminate is configured to face the curable material. The vacuum infusion heating bag can withstand multiple tool cycles of vacuum of less than ambient pressure without significant leakage. The curable material can be any type of permeable material that may be hardened through curing, such as composite material or dry fibers of a composite material. The permeating substance may include liquid resin or other flowable substances. The tool may have a plurality of inlets and outlets, for transferring air and/or the permeating substance into and out of an area between the vacuum infusion heating bag and the tool.

The vacuum infusion heating bag provided in the presently disclosed and claimed inventive concept(s) can be used to provide heat to the B side through conductive heat transfer. As a result, the B side can be heated very quickly and reach the cure temperature of resin in a short time. In addition, the substantially transparent vacuum infusion heating bag allows an operator to observe resin flow over the tool. Moreover, the vacuum infusion heating bag is thin and lightweight so it is easy for the operator to use. In one non-limiting embodiment, the first layer of the flexible polymer material has a thickness of less than about 1.0 mm and the second layer of the flexible polymer material has a thickness of less than about 1.5 mm. In another non-limiting embodiment, the second flexible polymer material has a thickness of less than about 1.2 mm. In one non-limiting embodiment, the total thickness of the vacuum infusion heating bag is less than about 2.2 mm. The total weight of the vacuum infusion heating bag with 1 meter×0.5 meter can be less than about 2.6 pounds.

The use of the vacuum infusion heating bag in the presently disclosed and claimed inventive concept(s) can significantly decrease the cure time. In a non-limiting embodiment, the cure cycle time can be reduced by at least about 25%. For example but not by way of limitation, the cure cycle time for a big epoxy composite part is about 5.5 hours using a traditional vacuum bag. The cure cycle time can be reduced to less than 4 hours using the vacuum infusion heating bag provided in the presently disclosed and claimed inventive concept(s).

In addition, the vacuum infusion heating bag in the presently disclosed and claimed inventive concept(s) can be stretched over and/or around changes in the contour of a surface to adequately cure regions of a curable material that would otherwise to be difficult to cure. When the vacuum infusion heating bag is stretched in the X and/or Y directions, the heating element can be stretched in the same direction and continue to generate heat. Consequently, the vacuum infusion heating bag can maintain sufficient contact with the curable material as a contour of the curable material's surface changes. Therefore, the vacuum infusion heating bag can maintain a temperature in a curable material that will adequately cure in a ridge or other types of changes in the composite material's surface contour. The vacuum infusion heating bag is also very flexible. It can be bent without permanent deformation by at least 45 degrees or by at least 90 degrees.

The flexible polymer material, in one non-limiting embodiment, comprises substantially transparent and thermally conductive silicone rubber. Generally, the silicone rubber has a higher thermal conductivity than other organic rubber. In order to improve the thermal conductivity of the silicone rubber, thermal conductive fillers can be added into the silicon rubber composition. In a non-limiting embodiment, the thermal conductive fillers include, for example but not by way of limitation, aluminum oxide, baron nitride, aluminum nitride, zinc oxide, silicon carbide, silica, and aluminum hydroxide. An exemplary silicone rubber with high thermal conductivity for use with the presently disclosed and claimed inventive concept(s) is described in U.S. Pat. No. 5,705,258, the entire disclosure of which is hereby incorporated by reference. The amount of the thermally conductive filler is generally 25 to 90% by weight, such as from 50 to 85% by weight, of the flexible polymer material. The silicone rubber can be a room temperature vulcanizing (RTV) silicone.

In addition, the silicone rubber can be a flame-retardant silicone rubber that is substantially transparent. The transparent and flame-retardant silicone rubber is described in U.S. Pat. No. 4,948,826, the entire disclosure of which is hereby incorporated by reference. An exemplary transparent and flame retardant silicone rubber composition comprises an organopolysiloxane, a platinum compound, an organoperoxide, a microparticulate silica, an organotitanium compound and a reaction product of a cerium compound and an alkali metal silanolate.

In one non-limiting embodiment, the silicone rubber used in the presently disclosed and claimed inventive concept(s) can be an adhesive silicone rubber. The adhesive silicone rubber is described in U.S. Pat. No. 7,592,070, the entire disclosure of which is hereby incorporated by reference. As such, the adhesive silicone rubber composition may comprise, for example but not by way of limitation, an organopolysiloxane having at least two silicon-bonded alkenyl groups in each molecule, an organopolysiloxane resin with the average unit formula: $R^1{}_3SiO_{1/2})_x(SiO_{4/2})_{1.0}$ in which $R^1$ is substituted or unsubstituted monovalent hydrocarbon group and x is a number from 0.5 to 1.0, an organopolysiloxane that contains at least two silicon-bonded hydrogen atoms in each molecule, and a hydrosilylation catalyst. The adhesive silicone rubber is transparent with stable and permanent adhesiveness.

A heating element in the presently disclosed and claimed inventive concept(s) can be a Positive Temperature Coefficient (PTC) device. The PTC device comprises at least two electrodes and a PTC composition, in which the electrodes are electrically connected to the PTC composition. The electrodes are connected to a power supply so that the current can flow through the PTC device. The electrodes comprise a conductive metal wire having superior conductivity. Examples of the conductive metal wires can include, for example but not by way of limitation, a tin-plated copper wire, a nickel-plated copper wire, a silver wire, a copper wire, a platinum wire, and a gold wire.

The PTC composition is made of PTC materials. The PTC materials are conductive materials characterized by a rapid increase in resistivity upon reaching a particular temperature or over a particular temperature range. For the PTC material, the flow of electric current therethrough causes the temperature of the material to rise through Joules heating, and therefore the resistance. The term "switching temperature" (Ts) is used to denote the temperature at which the rapid increase takes place. When the increase takes place over a temperature range then Ts can conveniently be designated as the temperature at which extensions of the substantially straight portions of the plot of the log of the resistance against the temperature (above and below the range) cross. The resistance of PTC material continues to increase as the temperature rises above Ts until it reaches a maximum, called the Peak Resistance, at a temperature which is called Peak Temperature. At the Peak Temperature, the resistance of PTC material becomes so high that the current is limited to a negligible value. The PTC device is said to be in its "tripped" state. One of the main benefits of PTC material is that no additional electronic circuits are necessary in an article that includes a PTC material since the PTC material has a characteristic similar to electronic circuits. Moreover, upon cooling, the material resets itself. Thus, the PTC device comprising PTC materials can be used as a self-controlled heater. When connected to a power source, the PTC material will heat up to the trip temperature and maintain this temperature without using any additional electronic controllers.

A traditional heater system does not display a decrease in electrical current with an associated temperature increase under the same conditions. One example of such a traditional heater system is a Negative Temperature Coefficient (NTC) device. PTC devices are intrinsically safer than NTC devices due to their ability to self-regulate their electrical current consumption. In addition, electrical energy and power consumption decreases as the temperature increases.

The PTC materials can be polymeric PTC materials or ceramic PTC materials. The polymeric PTC materials are based on natural and/or synthetic polymers dispersed with electrically conductive fillers. Examples of the polymers include, for example but not by way of limitation, polyesters such as polyethylene terephthalate, polybutylene terephthalate and polycaprolactone; polyamides such as nylon 6, nylon 66, nylon 11, nylon 12 and high temperature nylons; polyolefins such as polyethylene or polypropylene; copolymers (including terpolymers, etc.) of olefins; halogenated vinyl or vinylidene polymers such as polyvinyl chloride, polyvinylidene chloride, polyvinyl fluoride, polyvinylidene fluoride and copolymers of these monomers with each other or with other unsaturated monomers; polyamide copolymers; thermoplastic polyethers; polyphenylene sulfide; polyketones; thermoplastic polyimides; thermoplastic modified celluloses and mixtures including at least one of the foregoing polymeric materials. In addition, polymers can also be silicone rubbers, EPDM (ethylene propylene diene monomer) rubbers, Neoprene (polychloroprene), epoxy resin, polyurethane and phenolic resin.

The electrically conductive fillers can be selected from carbon black, a metal, graphite, carbon fibers, conductive ceramic fillers, glass and/or mineral fillers coated with a metal layer, carbon nanotubes, graphitic nanofibers, and/or mixtures including at least one of the foregoing fillers. Exemplary carbon blacks are those having average particle sizes less than about 200 nm. In one non-limiting embodiment, carbon blacks having particle sizes of less than about 100 nm can be used. In another non-limiting embodiment, carbon blacks having particle sizes of less than about 50 nm can be used.

The carbon blacks may have surface areas of less than about 400 m$^2$/g. In one non-limiting embodiment, the carbon blacks may have surface areas of less than about 100 m$^2$/g. Exemplary carbon blacks may have a pore volume (as measured by dibutyl phthalate absorption) less than about 200 ml/100 g), preferably the DBP-absorption is between about 50 and about 150 ml/100 g. It is beneficial for the carbon black to have a low ionic content (chlorides, sulfates, phosphates, fluorides, and nitrates) of 4 parts per million per gram (ppm/g) or less.

In selected embodiments of the presently disclosed and claimed inventive concept(s), carbon black is used in amounts of about 0.01 wt % to 65 wt % of the total weight of the PTC material. In one non-limiting embodiment, carbon black is used in amounts of about 0.25 wt % to about 50 wt %, based on the total weight of the PT material. In another non-limiting embodiment, carbon black is used in amounts of about 1 wt % to about 30 wt %, based on the total weight of the PTC material. In yet another non-limiting embodiment, carbon black is used in amounts of about 2 wt % to about 10 wt %, based on the total weight of the PTC material.

Formulations containing a sufficient amount of graphite show an improved thermal conductivity which can prevent the formation of hot spots in operation, i.e. when hooked up to a power source. In a non-limiting embodiment of the presently disclosed and claimed inventive concept(s), graphite particles can be used in combination with the carbon black.

Solid conductive metallic fillers may also be used in the PTC material. These may be electrically conductive metals or alloys that do not melt under conditions used in incorporating them into polymers, and fabricating finished articles there from. Metals such as aluminum, copper, magnesium, chromium, tin, nickel, gold, silver, iron, titanium, or the like, or a combination including at least one of the foregoing metals may be incorporated. Physical mixtures and true alloys such as stainless steels, bronzes, or the like, may also serve as conductive fillers.

Conductive ceramic fillers such as boron nitride, alumina, aluminum nitride and silicon carbide can be added to improve the thermal conductive properties and reduce or eliminate the hot spots. In addition, a few intermetallic chemical compounds such as borides, carbides, or the like, of these metals, (e.g., titanium diboride) can also serve as conductive filler particles. Solid non-metallic, conductive filler particles such as tin-oxide, indium tin-oxide, antimony oxide, or the like, or a combination including at least one of the foregoing fillers may also be added to render the polymers conductive. The solid metallic and non-metallic conductive fillers may exist in the form of powder, drawn wires, strands, fibers, tubes, nanotubes, flakes, laminates, platelets, ellipsoids, discs, and other commercially available geometries.

Regardless of the exact size, shape and composition of the solid conductive metallic and non-metallic conductive filler particles, they may be dispersed into the PTC material of loadings of about 0.01 to about 80 wt %, based on the total weight of the PTC material. In one non-limiting embodiment, the solid metallic and non-metallic conductive filler particles may be used in amounts of about 0.25 wt % to about 40 wt %, based on the total weight of the PTC material. In another non-limiting embodiment, the solid conductive metallic and non-metallic conductive filler particles may be used in amounts of about 0.5 wt % to about 30 wt %, based on the total weight of the PTC material. In yet another non-limiting embodiment, the solid conductive metallic and non-metallic conductive filler particles may be used in amounts of about 1 wt % to about 20 wt %, based on the total weight of the PTC material.

Non-conductive, non-metallic fillers that have been coated over a substantial portion of their surface with a coherent layer of solid conductive metal may also be used in the PTC material. The non-conductive, non-metallic fillers are commonly referred to as substrates, and substrates coated with a layer of solid conductive metal may be referred to as "metal coated fillers". Typical conducting metals such as aluminum, copper, magnesium, chromium, tin, nickel, silver, iron, titanium, and mixtures including any one of the foregoing metals may be used to coat the substrates. Examples of such substrates can include, but are not limited to, silica powder such as fused silica and crystalline silica, boron-nitride powder, boron-silicate powder, alumina, magnesium oxide (or magnesia), wollastonite including surface-treated wollastonite, calcium sulfate (as its anhydride, dihydrate or trihydrate), calcium carbonate including chalk, limestone, marble and synthetic, precipitated calcium carbonates, generally in the form of a ground particulates, talc, including fibrous, modular, needle shaped, and lamellar talc, glass spheres, both hollow and solid, kaolin, including hard, soft, calcined kaolin, and kaolin comprising various coatings to facilitate compatibility with the polymeric matrix resin, mica, feldspar, silicate spheres, flue dust, cenospheres, fillite, aluminosilicate, natural silica sand, quartz, quartzite, perlite, tripoli, diatomaceous earth, synthetic silica, and mixtures including any one of the foregoing substrates. All of the above substrates may be coated with a layer of metallic material for use in the PTC material.

The metal-coated fillers may be dispersed into the PTC material with a loading of about 0.01 to about 80 wt %, based on the total weight of the PTC material. In one non-limiting embodiment, the metal-coated fillers may be used in amounts of about 0.25 wt % to about 50 wt %, based on the total weight of the PTC material. In another non-limiting embodiment, the metal-coated fillers may be used in amounts of about 0.5 wt % to about 30 wt %, based on the total weight of the PTC material. In yet another non-limiting embodiment, the metal-coated fillers may be used in amounts of about 1 wt % to about 10 wt %, based on the total weight of the PTC material.

The polymer is generally used in amounts of about 5 to about 95 weight percent (wt %), based on the total weight of the PTC material. In one non-limiting embodiment, the polymer is generally used in amounts of about 15 to about 90 wt %, based on the total weight of the PTC material. In another non-limiting embodiment, the polymer is generally used in amounts of about 30 to about 80 wt %, based on the total weight of the PTC material. In yet another non-limiting embodiment, the polymer is generally used in amounts of about 35 to about 75 wt %, based on the total weight of the PTC material.

The PTC material can be formed by melting a polymer and mixing electrically conductive particles into the polymer. The polymer and the conductive particles may either be blended or melt blended together. The blending or melt blending may be done on a roll mill, in a melt-mixing chamber, in an extruder, or using any other similarly known technique. The mixing should take place at a sufficient temperature to accomplish an even dispersion of the components.

In one non-limiting embodiment, a PTC composition has a mesh shape. A PTC device comprises a woof, a warp and at least two electrodes formed longer than the woof or the warp. The woof and warp are made of a PTC material. In another non-limiting embodiment, the woof and/or the warp comprise a matrix of heat conductive material, a strength supplement fiber glass string and an electrical insulation coating. The matrix of heat conductive material comprises a polymer matrix and conductive particles wherein the conductive particles are dispersed inside the polymer matrix. One such commercial product, HOTmesh™ (World Scientific Development), can be used as a PTC device in the presently disclosed and claimed inventive concept(s).

A vacuum infusion heating bag in the presently disclosed and claimed inventive concept(s) comprises a laminate containing a heating element. The heating element is laminated between a first layer and a second layer of flexible polymer materials such that the layers of polymer materials substantially encompass the heating element. The flexible polymer materials are laminated to each other to secure the heating element and to form a reformable continuous element structure. The flexible polymer materials may simultaneously be heated and compressed under sufficient pressure to effectively fuse the polymer materials together. A portion of this heat may come from energizing the heating element. In one non-limiting embodiment, a laminate can be made by heating two silicone rubber sheets to about 150° C. and applying about 3 bar of pressure for about 15 minutes.

Alternatively, a heating element may be placed within a bag-shaped polymer material where the top layer of the bag may be considered a first layer of polymer material and the bottom layer of the bag may be considered as a second layer of polymer material (e.g., two layers of polymer materials secured along mating edges, but providing an opening for insertion of the heating element). Air from within the bag may be evacuated, e.g., by pulling a vacuum, thereby collapsing the bag around the heating element, and then heat and/or pressure may be applied to the collapsed structure to create a single laminate encapsulating the heating element. Also, the laminate can be formed by extruding a tubular shaped polymer body, disposing a heating element within the polymer body, and heating and compressing the body, particularly along the edges to secure the heating element within the polymer body.

The substantially transparent and reusable vacuum infusion heating bag of the presently disclosed and claimed inventive concept(s) further comprises an integral flat flange extending peripherally around the laminate. The flange is used to seal the vacuum infusion heating bag. A sealant apparatus is applied peripherally between the flange and the tool for sealing the tool, and provides vacuum tight sealing of the vacuum infusion heating bag to the tool during debulking and curing of the composite part.

The sealing apparatus may be any device or material for creating air-tight seal between the vacuum infusion heating bag and the tool. For example but not by way of limitation, the sealing apparatus may be sealing tape. Alternatively, the sealing apparatus may be a rubber or silicone sealing device as disclosed in U.S. Pat. No. 8,128,396, the entire disclosure of which is hereby incorporated by reference. The sealing apparatus can be attached to or integral with the laminate. FIG. 1 shows a photograph of a substantially transparent and reusable vacuum infusion heating bag in accordance with one non-limiting embodiment of the presently disclosed and claimed inventive concept(s). The heating element is HOTmesh™ from World Scientific Development and the flexible polymer material is a substantially transparent, reusable, thermal conductive and flame retardant silicone rubber sheet from Arlon Silicone Technology Division.

Figure 2:
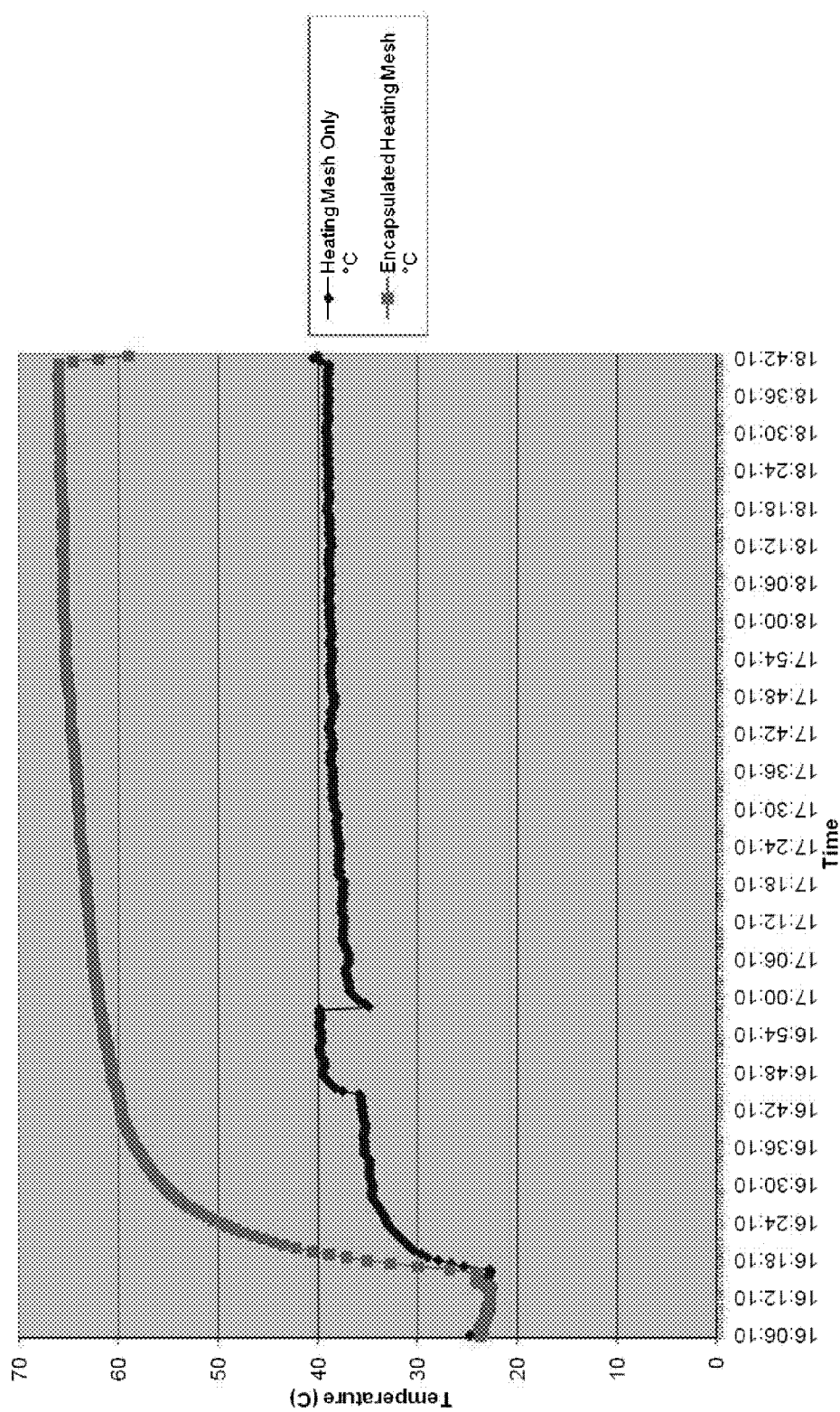
FIG. 2 is a graph comparing temperatures vs. heating time between a heating mesh and an encapsulated heating mesh with silicone rubber in accordance with one embodiment of the presently disclosed and claimed inventive concept(s).

The transparent and reusable vacuum infusion heating bag in the presently disclosed and claimed inventive concept(s) can be used to provide heat for curable material in a very short time. In fact, the heating element in the vacuum infusion heating bag generates a synergistic effect which provides more heat than the heating element itself. This synergistic effect, shown in FIG. 2, indicates that the temperatures generated from the encapsulated heating mesh by silicone rubber are more than 20° C. higher than those without silicone rubber under the same heating conduction and time. As a result, the cure time using the vacuum infusion heating bag in the presently disclosed and claimed inventive concept(s) can be significantly reduced compared to using a traditional vacuum bag.

The transparent and reusable vacuum infusion heating bag with a heating element can be used in molding polymeric materials, such as thermosetting and thermoplastic composites. Such molding operations are known to include standard bagging and resin transfer molding techniques.

In one embodiment of the presently disclosed and claimed inventive concept(s), a method for using a substantially transparent and reusable vacuum infusion heating bag with a heating element comprises a first step of placing a curable material onto a tool. In one non-limiting embodiment, the tool may have at least one injection pump inlet and at least one vacuum pump outlet. In another non-limiting embodiment, the transparent and reusable vacuum infusion heating bag may contain at least one injection pump inlet and at least one vacuum pump outlet. Next, the substantially transparent and reusable vacuum infusion heating bag may be placed over the curable material with a second side of the bag facing the curable material and properly aligned with the tool. The vacuum infusion heating bag may have an area greater than the curable material, such that the second side of the vacuum infusion heating bag proximate the integral flat flange can be sealed to the tool. Then, the vacuum infusion heating bag can be sealed around the integral flat flange with a sealing apparatus. The sealing apparatus can be the same as those described previously and/or within the patent documents herein by reference.

At least one vacuum pump can be connected via at least one vacuum pump outlet to suction air out from between the vacuum infusion heating bag and the tool. As air is pumped out or otherwise evacuated from between the vacuum infusion heating bag and the tool, a permeating substance can be simultaneously pulled in through the at least one injection pump inlet and through the curable material. Then at least a portion of the permeating substance may flow out through the at least one injection pump inlet. An operator can observe the permeating substance's flow. Once the permeating substance covers the curable material, the operator can stop the injection inlet and increase the temperature of the tool and vacuum infusion heating bag. In one non-limiting embodiment, the cure temperature can be in a range of about 50° C. to about 80° C. In another non-limiting embodiment, the cure temperature can be reached up to about 70° C. Once the curable material has been cured, the vacuum infusion heating bag can be removed and reused.

It should be noted that steps of the above method may be performed in various orders and/or with steps added or omitted without departing from the scope of the invention.

What is claimed is:

1. A substantially transparent and reusable vacuum infusion heating bag for heating one or more curable material on a tool, dispersing a permeating substance through the one or more curable material and forming a composite part, comprising:
a substantially transparent laminate containing a heating element, the heating element being sandwiched between a first layer and a second layer of flexible polymer material, a first side of the laminate is configured to face away from the curable material, and a second side of the laminate is configured to face the curable material wherein the heating element comprises a Positive Temperature Coefficient device comprising a Positive Temperature Coefficient material, wherein the Positive Temperature Coefficient material comprises an electrically conductive filler dispersed in the Positive Temperature Coefficient material at loadings of about 0.01 to about 80 wt %, based on the total weight of the Positive Temperature Coefficient material;
wherein the flexible polymer material is substantially transparent and thermally conductive and comprises a silicone rubber composition and a thermally conductive filler.

2. The vacuum infusion heating bag of claim 1, wherein the flexible polymer material is flame retardant.

3. The vacuum infusion heating bag of claim 1, wherein the first layer of the flexible polymer material has a thickness of less than about 1.0 mm.

4. The vacuum infusion heating bag of claim 1, wherein the second layer of the flexible polymer material has a thickness of less than about 1.5 mm.

5. The vacuum infusion heating bag of claim 1, wherein the laminate provides a temperature of between about 50° C. and about 80° C.

6. The vacuum infusion heating bag of claim 1, wherein the Positive Temperature Coefficient device comprises a Positive Temperature Coefficient composition and at least two electrodes.

7. The vacuum infusion heating bag of claim 6, wherein the Positive Temperature Coefficient composition is electrically connected to the electrodes.

8. The vacuum infusion heating bag of claim 6, wherein the Positive Temperature Coefficient composition has the shape of a mesh.

9. The vacuum infusion heating bag of claim 1, wherein the electrically conductive filler is carbon black.

10. The vacuum infusion heating bag of claim 6, wherein the electrodes comprise a conductive metal wire having superior conductivity.

11. The vacuum infusion heating bag of claim 1, further comprising an integral flat flange along a perimeter of the laminate.

12. The vacuum infusion heating bag of claim 11, further comprising a sealing apparatus being configured for vacuum sealing the second side of the laminate around the integral flat flange and against the tool.

13. The vacuum infusion heating bag of claim 1, wherein the permeating substance is a liquid resin.

* * * * *

UNITED STATES PATENT AND TRADEMARK OFFICE
CERTIFICATE OF CORRECTION

PATENT NO.         : 9,242,415 B2
APPLICATION NO.    : 13/543392
DATED              : January 26, 2016
INVENTOR(S)        : Mohammad Irfan Huda et al.

Page 1 of 1

It is certified that error appears in the above-identified patent and that said Letters Patent is hereby corrected as shown below:

Title Page, item (75) Inventors: second inventor's first name, please delete "Bernle" and replace with -- Bernie --

Signed and Sealed this
Sixteenth Day of August, 2016

Michelle K. Lee
*Director of the United States Patent and Trademark Office*